United States Patent [19]
Larkin et al.

[11] 3,910,858

[45] Oct. 7, 1975

[54] NOVEL PROCESS AND PRODUCT

[75] Inventors: William A. Larkin, Morristown; Robert C. Ringwood, Jr., Sewaren; Kenneth Treadwell, Rahway, all of N.J.

[73] Assignee: M & T Chemicals Inc., Greenwich, Conn.

[22] Filed: June 20, 1974

[21] Appl. No.: 481,132

Related U.S. Application Data

[62] Division of Ser. No. 405,072, Oct. 10, 1973, Pat. No. 3,857,802.

[52] U.S. Cl. ....... 260/42.49; 260/42.27; 260/42.56; 260/45.75 R
[51] Int. Cl.².. C08K 3/26; C08K 5/59; C08L 27/06
[58] Field of Search.......... 260/42.27, 42.49, 42.56, 260/45.75 R

[56] References Cited
UNITED STATES PATENTS

| | | | |
|---|---|---|---|
| 2,403,215 | 12/1954 | Beck | 260/42.49 |
| 3,810,864 | 5/1974 | White | 260/42.49 |

*Primary Examiner*—Donald E. Czaja
*Assistant Examiner*—C. Warren Ivy
*Attorney, Agent, or Firm*—Robert P. Auber; Kenneth G. Wheeless; Robert Spector

[57] ABSTRACT

Structural discontinuities, commonly referred to as splits and voids, which are prevalent in flexible and semiflexible polyurethane foams that have been rendered flame resistant using halogen-containing polymers in combination with antimony oxide are eliminated by the use of barium carbonate.

2 Claims, No Drawings

NOVEL PROCESS AND PRODUCT

This is a divisional of application Ser. No. 405,072 filed Oct. 10, 1973, now U.S. Pat. No. 3,857,802.

BACKGROUND

This invention relates to flame retardant flexible polyurethane foams. This invention further relates to improved flame retardants for said foams wherein the active ingredients of said flame retardants are a halogen-containing polymer and antimony trioxide.

Flexible and semiflexible polyurethane foams have found widespread utility as insulation, structural reinforcement, cushioning and encapsulating material for electrical and electronic components. One factor which has limited the widespread acceptance of these foams in applications such as carpet backing has been their high degree of flammability when exposed to flame or high temperatures. The combination of antimony trioxide and a halogen source such as halogen-containing polymers imparts useful levels of flame retardancy to a variety of cellular and non-cellular synthetic organic polymers, notably polyolefins and unsaturated polyester resins. U.S. Pat. No. 3,075,928 discloses using this type of flame retardant for flexible polyurethane foams. While this combination may impart acceptable levels of flame retardancy under a given set of conditions, the interior structure of the resultant foam often contains numerous irregularities referred to in the art as "splits" and "voids." The reason for this undesirable phenomenon is not completely understood, however, it is believed that the antimony oxide interferes with one or more of the reactions which occur during preparation of the foam. These reactions must be maintained in proper equilibrium to obtain a foam with the desired density and uniform cell structure.

Accordingly, it is an object of this invention to eliminate or reduce to an insignificant level the structural defects, particularly splits and voids, which characterize flexible polyurethane foams containing antimony oxide.

SUMMARY OF THE INVENTION

This invention provides an improved flame retardant flexible polyurethane foam containing antimony trioxide and a halogen-containing polymer as the flame retarding component, wherein the improvement resides in the presence of barium carbonate in an amount between 2 and 100 percent, based on the weight of the antimony trioxide.

DETAILED DESCRIPTION OF THE INVENTION

The formulations employed to prepare flame retardant flexible polyurethane foams in accordance with the present invention contain 100 parts by weight of polyol, 2 to 20 parts of a mixture of antimony trioxide and barium carbonate wherein the barium carbonate constitutes between 2 and 50 percent by weight of said mixture and between 40 and 70 percent, based on the weight of said mixture, of a halogen-containing polymer.

The halogen-containing polymers employed in combination with the antimony trioxide include those wherein the major or sole repeating unit is derived from vinyl chloride, vinyl bromide, vinyl fluoride or vinylidene chloride. If other repeating units are present, these are conventionally derived from vinyl acetate, vinyl stearate, methacrylonitrile, acrylonitrile, and lower alkyl esters of unsaturated acids such as maleic, fumaric, acrylic and methacrylic acids wherein the alcohol residue of the ester contains between 1 and 18 carbon atoms. Other suitable halogen-containing polymers and resins include chlorinated rubber, chlorinated polyethylene or other polyolefin, polytetrafluoroethylene and mixtures of any of the foregoing polymers.

The foregoing halogen-containing polymers should be finely divided (powder from about 0.0001 to 2 mm.) and have an intrinsic viscosity of from about 0.25 to 2.5, preferably from about 0.5 to 1.5. The halogen-containing resinous polymers are generally used in an amount of from about 2 to 100 parts by weight per 100 parts by weight of the polyol to obtain the desired load bearing characteristics, but in many instances there need be only about 5 to 40 parts, preferably from about 15 to 30 parts by weight. The halogen-containing polymers can be made by bulk, solvent, emulsion or suspension polymerization processes. It is preferred to use halogen-containing polymers made by the emulsion polymerization process. Of these halogen-containing resins it also is preferred to employ polyvinyl chloride, especially emulsion polymerized polyvinyl chloride (plastisol grade).

Polyols used in making the polyurethanes of the present invention are primary and secondary hydroxy-terminated polyoxyalkylene ethers having from 2 to 4 hydroxyl groups and a molecular weight of from about 1,000 to 10,000. They are liquids or are capable of being liquefied or melted for handling in the polyurethane foaming apparatus or machine.

Examples of polyoxyalkylene polyols include linear and branched polyethers having a plurality of ether linkages and containg at least two hydroxyl groups and being substantially free from functional groups other than hydroxyl. Among the polyoxyalkylene polyols which are useful in the practice of this invention are the polyethylene glycols, the polypropylene glycols, and polybutylene ether glycols. Polymers and copolymers of polyoxyalkylene polyols are also adaptable in the process of this invention as well as the block copolymers of ethylene oxide and propylene oxide. Among the copolymers of polyoxyalkylene polyols that deserve some special mention are the ethylene oxide, propylene oxide and butylene oxide adducts of ethylene glycol, propylene glycol, diethylene glycol, dipropylene glycol, triethylene glycol, 2-ethylhexane-diol-1,3,glycerol, 1,2,6-hexanetriol, trimethylopropane, trimethylolethane, tris(hydroxyphenyl) propane, triethanolamine, triisopropanolamine, ethylenediamine, and ethanolamine. Linear and branched copolyethers of ethylene oxide and propylene oxide are also useful in making the foamed products of this invention with the preferred ones being those end-blocked with ethylene oxide to provide primary hydroxyl groups in the polymer and having molecular weights of from about 2000 to 5000.

Further useful types of polyetherpolyols are block copolymers prepared from propylene oxide and ethylene oxide. These polyethers can be characterized by the general formulae:

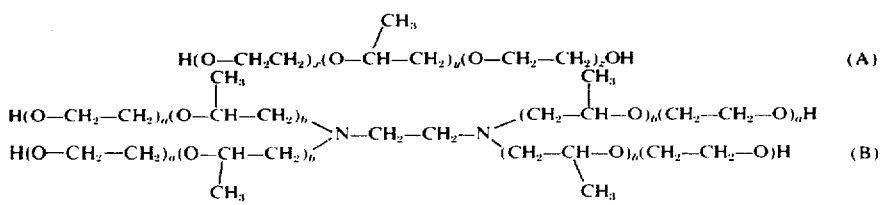

where in Formula A the total of subscripts, $x$, $y$, and $z$ represent positive integers in the range of from 20 to 70 and the total of subscripts $a$ and $b$ of Formula B represent positive integers in the range of from 20 to 100.

Polyethers having a branched chain network are also useful. Such branched chain polyethers are readily prepared from alkylene oxides of the type above described and initiators having a functionality greater than two. Branched polyethers have the advantage of making possible cross linking without the interaction of urea or urethane groups with the isocyanate groups. This has the advanatage of making a larger proportion of the isocyanate used available for the evolution of carbon dioxide and the reducing of the overall amount of isocyanate that is required in the preparation of the foamed polymer. Mixtures of polyether polyols can be used.

Likewise, there can be used as polyols grafts of ethylenically unsaturated monomers such as acrylonitrile, methacrylonitrile, vinyl acetate, methyl acrylate and the like on the polyols and having the functionality and molecular weight as shown above. Such graft polyols and methods for making the same are shown in the U.S. patents to Stamberger, U.S. Pat. Nos. 3,304,273 and 3,383,351 and in the U.S. Patent to Von Bonin, U.S. Pat. No. 3,294,711.

When desired, cross-linking materials having from 2 to 8 hydroxyl groups can be included in the foam formulation to increase cross link density. They have molecular weights of from about 60 to 600. Only small amounts of such materials are generally needed (about 0.3 to 10 moles per 100 moles of polyol). Examples of such crosslinking agents are glycol, diethylene glycol, propylene glycol, butane diol-1,4, dipropylene glycol, glycerol, trimethylolpropane, butane triols, hexanetriols, trimethylolphenol, tris(hydroxyphenyl)propane, tris(hydroxyxylyl)propane, various tetrols, such as erythritol and pentaerythritol, pentols, hexols, such as dipentaerythritol and sorbitol, as well as alkyl glucosides, carbohydrates, polyhydroxy fatty acid esters such as castor oil and polyoxy alkylated derivates of polyfunctional compounds having three or more reactive hydrogen atoms, such as, for example, the reaction product of trimethylolpropane, glycerol, 1,2,6-hexanetriol, sorbitol and other polyols with ethylene oxide, propylene oxide or other alkylene epoxides or copolymers thereof, e.g., copolymers of ethylene and propylene oxides. Grafted crosslinkers can be prepared by the process of the aforementioned Stamberger and Van Bonin U.S. Patents. Mixtures of crosslinkers can be used. All the polymer-forming ingredients should preferably be free of any amine function which is not sterically hindered or shielded.

Any organic di- or tri-isocyanate can be used in the practice of the present invention. Diisocyanates are preferred, particularly when there is any considerable amount of branching in the polyol or crosslinker to avoid the formation of rigid or semi-rigid foams and vice versa. Examples of suitable organic polyisocyanates to use are ethylene diisocyanate, trimethylene diisocyanate, tetramethylene diisocyanate, pentamethylene diisocyanate, hexamethylene diisocyanate, propylene-1,2-diisocyanate, butylene-1,2-diisocyanate, butylene-1,3-diisocyanate, butylene-2,3-diisocyanate, alkylidene diisocyanates such as ethylidene diisocyanate and butylidene diisocyanate; cycloalkylene diisocyanates such as cyclopentylene-1,3-diisocyanate, cyclohexylene-1,2-diisocyanate, cyclohexylene-1,3-diisocyanate, and cycloalkylidene diisocyanates such as cyclopentylidene diisocyanate and cyclohexylidene diisocyanate; aromatic diisocyanates such as m-phenylene diisocyanate, p-phenylene diisocyanate, polymethylene polyphenylisocyanate, 2,4-tolylene diisocyanate, 2,6-tolylene diisocyanate, bitolylene diisocyanate, naphthalene-1,4-diisocyanate, and diphenylene-4,4'-diisocyanate; aliphatic-aromatic diisocyanates such as xylylene-1,4-diisocyanate, xylylene-1,3-diisocyanate, bis(4-isocyanatophenyl) methane, bis(3-methyl-4-isocyanatophenyl) methane, and 4,4'-diphenylpropane diisocyanate, durylene diisocyanate, 4,4',4''-tris(isocyanatophenyl) methane, 3,10-diisocyanatotricyclo[5.2.1.0$^{2,6}$]decane, bis-(2-isocyanatoethyl carbonate), and naphthalene triisocyanate and the like. Mixtures of polyisocyanates can be used.

The amount of polyisocyanate employed ranges from about 0.70 to 1.35 total moles of NCO (in the polyisocyanates) per total mole of active hydrogen [as determined by the Zerewitinoff method, J.A.C.S., vol. 49, p. 3181 (1927)] in the polyols, crosslinkers, water, halogen-containing resins (such as partially hydrolyzed vinyl chloride-vinyl acetate copolymers) and any other active hydrogen-containing material in the polyurethane foam formulation.

Water is used as a blowing agent and is employed in amounts of from about 1.5 to 5 parts by weight per 100 parts by weight of the polyol.

The water should be substantially or essentially pure, that is, it should be free of impurities such as ions, sols, etc. of mineral, vegetable or snythetic origin and the like which would adversely affect the foaming action or the properties of the resultant polyurethane foam. Deionized, distilled or otherwise purified water should be employed.

If lower density and softer foams are desired there additionally can be added to the polyurethane foam formulation separately or in admixture with one of the other components, i.e., polyol or polyisocyanate, etc., up to about 25 parts by weight of a fluorocarbon blowing agent per 100 parts by weight of the polyol. Examples of such blowing agents are those fluorine substituted aliphatic hydrocarbons which have boiling points between about −40°C. and +170°C., and which vaporize at or below the temperature of the foaming mass. The blowing agents include, for example, trichloromonofluoromethane, dichlorodifluoromethane, dichloromonofluoromethane, bromotrifluoromethane, chlorodifluoromethane, 1,1-dichloro-1-fluoroethane, 1,1-difluoro-1,2,3-trichloroethane, chloropentafluoroethane, 1-chloro-1-fluoroethane, 1-chloro-2- fluoroethane, 1,1,2-trichloro-1,2,2-trifluoroethane, 1,-1,1-trichloro-2,2,2-trifluoroethane, 2-chloro-nonafluorobutane, hexafluorocyclobutane, and octafluorocyclobutane. Still other easily vaporizable fluorocarbons can be used. Mixtures of the fluorocarbons can be used. Still other blowing agents can be used in full or partial replacement of the fluorocarbons such as propane, butane, pentane, pentene, hexane and so forth, and mixtures thereof, particularly where precautions are taken to prevent explosions or where removal of gasses is provided. See U.S. Pat. Nos. 3,072,582 and 3,391,093.

Catalysts for the polyetherpolyol-polyisocyanate reaction can be any catalyst heretobefore used in the art particularly the metal-containing catalysts. Examples of such catalysts, also referred to as gel catalysts, are (1) tertiary phosphines such as trialkylphosphines, dialkyl-benzylphosphines, and the like; (2) strong bases such as the alkali and alkaline earth metal hydroxides, alkoxides, and phenoxides; (3) acidic metal salts of strong acids such as ferric chloride, stannic chloride, stannous chloride, antimony trichloride, bismuth nitrate, bismuth chloride, and the like; (4) chelates of various metals such as those which can be obtained from acetylacetone, benzolyacetone, trifluoroacetylacetone, ethyl acetoacetate, salicylaldehyde, cyclopentanone-2-carboxylate, and the like, with various metals such as Be, Mg, Zn, Cd, Pb, Ti, Zr, Sn, As, Bi, Cr, Mo, Mn, Fe, Co, Ni, or ions such as $MoO_2^{++}$ and the like; (5) alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, beta-diketones and 2-(N,N-diarylamino) alkanols, such as the well known chelates of titanium obtained by said or equivalent procedures; (6) salts of organic acids with metals such as alkali metals, alkaline earth metals, Al, Sn, Pb, Mn, Co, Ni, and Cu, including, for example, sodium acetate, potassium laurate, calcium hexanoate, stannous acetate, stannous octoate, stannous oleate, lead octoate, metallic driers such as manganese, cobalt, or lead naphthenate and the like; (7) organometallic derivaties of tetravalent tin, trivalent and pentavalent arsenic, antimony and bismuth, and metal carbonyls of iron and cobalt; and (8) the dialkyltin salts of carboxylic acids, e.g., dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), and the like; as well as a trialkyltin hydroxide, dialkyltin oxide, dialkyltin dialkoxide, or a dialkyltin dichloride, such as trimethyltin hydroxide, tributyltin hydroxide, trioctyltin hydroxide, dibutyltin oxide, dioctyltin oxide, dibutyltin-bis(isopropoxide), dibutyltin-bis(2-methylaminopentylate), dibutyltin dichloride, dioctyltin dichloride, and the like and mixtures thereof. Preferred catalysts to use are the divalent tin salts of carboxylic acids having from 2 to 18 carbon atoms. These catalysts are used in an amount of from about 0.1 to 0.9 part by weight per 100 parts by weight of the polyetherpolyol. It is less preferable to use catalysts such as the metal salts, alcoholates, hydroxides, alkoxides and phosphines, especially in large amounts, where resins containing ester groups in a substantial amount are used since they tend to hydrolyze the ester linkages thereby causing scission of the backbone polymer chain and lowering of the physical and chemical properties of the resultant foams, especially under conditions of high temperature and humidity.

Surfactants or emulsifiers are necessary to provide the desired cell formation and growth. Polysiloxane-polyoxyalkylene block copolymers are preferred. Polysiloxane-polyoxyalkylene block copolymers are described in U.S. Patent Nos. 2,834,748 and 2,917,480. Another useful class of emulsifiers are the "non-hydrolyzable" polysiloxane-bpolyoxyalkylene block copolymers. This class of compounds differs from the above-mentioned polysiloxane-polyoxyalkylene block copolymers in that the polysiloxane moiety is bonded to the polyoxyalkylene moiety through direct carbon-to-silicon bonds, rather than through carbon-to-oxygen-to-silicon bonds. These copolymers generally contain from 5 to 95 weight percent, and preferably from 5 to 50 weight percent, of of polysiloxane polymer with the remainder being polyoxyalkylene polymer. The copolymers can be prepared, for example, by heating a mixture of (a) a polysiloxane polymer containing a silicon-bonded, halogen-substituted monovalent hydrocarbon group and (b) an alkali metal salt of a polyoxyalkylene polymer to a temperature sufficient to cause the polysiloxane polymer and the salt to react to form the block copolymer. Although the use of an emulsifier is desirable to influence the type of foam structure that is formed, the foam products of the invention can be prepared without emulsifiers. Still other polysiloxane polyoxyalkylene copolymers known to the art may be employed as well as silicones, turkey red oil and so forth. The surfactant is used in an amount of from about 0.3 to 2.5 parts by weight per 100 parts by weight of the polyether polyol.

It is highly advantageous to incorporate into the urethane compositions of the present invention at least one organic tertiary amine catalyst, preferably together with a metal-containing co-catalyst. The amount of organic amine catalyst may comprise, per 100 parts by weight of organic polyol, about 0.05 to 3.2 parts by weight. In the case of the polyether polyols where a metal catalyst is used for the urethane-forming reaction, it is preferred to use only from about 0.05 to 0.9 part by weight of the amine. On the other hand, where the tertiary amine is taking care of both the foaming ($H_2O+NCO$) and network ($-ROH+NCO$) reactions, the tertiary amines should be used in an amount of from about 0.9 to 3.2 parts by weight, based on 100 parts by weight of the polypolyol.

In the urethane compositions of the invention there may be used a wide variety of organic tertiary amine catalysts. Such organic amines, include, among others, tri-ethylene diamine, triphenyl amine, triethylamine, N,N,N', N'-tetramethyl-1,3-butane diamine, N-methyl morpholine, N-ethyl morpholine, N-acetyl morpholine, N-octyl morpholine, N-coco morpholine, N-phenyl morpholine, N-hydroxyl ethyl morpholine, N-hydroxyl methyl morpholine, 4,4'-dithiodimorpholine, dimethyl piperazine, N,N,N',N'-tetramethyl propane diamine, trimethyl aminoethyl piperazine, N,N-dimethyl ethanolamine, dimethyl hexadecylamine, 1-(2-ethyl-1-hexenyl) piperazine, tri-n-octylamine, trimethylamine, N,N-dimethyl benzyl amine, triethanolamine, 1,2,4-trimethylpiperazine, N-methyl dicyclohexylamine, and mixtures thereof.

Other well known constituents can be added to the polyurethane foam recipe such as clay, talc, $TiO_2$, silica and hydrated silica, $CaCO_3$, metal chromates, barytes, phthalocyanine green or blue pigments, red iron oxide, conventional stabilizers, carbon black, dyes, toners, epoxidized soy bean oil (Paraplex G-62), epoxides (Epon 828), tricresyl phosphate, antioxidants, fungicides, bacteriostats and the like. These constituents can be added in various amounts to the foaming ingredients to achieve the desired properties in the resultant flexible, low density foams.

The flexible, cellular urethane-vinyl chloride polymeric foams of the present invention can be used as cushions, mattresses, pillows, cushioning material for furniture and automobiles, rug underlay and especially as interior automobile door panels, head rests, and so forth.

The polyurethane foams of the present invention can be formed by a process known in the art as the "one-shot" process or by a two-step process involving, first, the preparation of a "prepolymer," the well known "semiprepolymer" or "quasi-prepolymer" technique. There all or a portion of the polyol is reacted with all of the organic polyisocyanate, providing a reaction product which contains a high percentage free isocyanate group and which is reacted with the remaining portion of the hydroxyl-terminated polyol or a cross-linker, together with water, catalysts, metal oxides and the halogen-containing polymer to form a rubbery, cellular, elastic product.

Regardless of the particular technique employed to disperse the antimony trioxide, halogen-containing polymer and barium carbonate, these can be dispersed in either the polyol phase or the isocyanate phase prior to the time at which the two are combined together with the other ingredients to obtain the cellular polyurethane. Alternatively, the dispersion can be prepared in a mixture of the isocyanate and polyol. To facilitate processing and increase efficiency of the flame retardant the average particle size of the solid additives should be between 0.5 and 15 microns, the small sizes and narrower ranges of particle size distribution being preferred.

The following example illustrates a preferred embodiment and should not be interpreted as limiting the scope of the invention as defined in the appended claims. All parts are by weight unless otherwise indicated.

EXAMPLE

Two flexible polyurethane foam samples were prepared and evaluated for flame retardancy. The formulations employed to prepare the samples were identical, with the exception that one contained antimony trioxide while the other contained an equal weight of a 94/6 weight ratio mixture of antimony trioxide/barium carbonate.

The formulations, designated as A and B, exhibited the following composition.

| Ingredient | Parts by Weight in formulation | |
|---|---|---|
| | A | B |
| Polyol[1] | 100 | 100 |
| Isocyanate[2] | 52.0 | 52.0 |
| Surfactant[3] | 1.0 | 1.0 |
| Water | 4.0 | 4.0 |
| Polyvinyl chloride resin[4] | 22.0 | 22.0 |
| Stannous octoate | 0.4 | 0.4 |
| Blowing catalyst[5] | 0.15 | 0.15 |

-Continued

| Ingredient | Parts by Weight in formulation | |
|---|---|---|
| | A | B |
| Zinc Oxide | 3.0 | 3.0 |
| Antimony trioxide | 7.0 | — |
| Antimony trioxide/barium carbonate (94/6) | — | 7.0 |

[1]polyoxypropylene triol, molecular weight = 3000
[2]a mixture of m- and p- tolyl diisocyanates, exhibiting a weight ratio of 80/20, respectively
[3]a non-hydrolyzable dimethyl siloxane - alkylene oxide copolymer available as L550 from Union Carbide Chemical Corp.
[4]a dispersion grade vinyl chloride homopolymer available as Geon 121 from the Goodrich Chemical Company
[5]a mixture of between 50 and 60% by weight of antimony tris tallate and 40–50% by weight of the potassium salt of Nopchelate OS as disclosed in Table I of U.S. Patent 3,620,985, which is hereby incorporated by reference. Nopchelate OS (sold by Nopco Chemical Company, Newark, New Jersey) comprises nitrogen-containing organic acids having the formula $C_xH_yO_2N$ wherein x ranges from 10 to 18 and y ranges from 21 to 37 and alkali metal salts of said acids. "Nopchelate OS" exhibits a molecular weight of approximately 270, a specific gravity of 1.0 and contains 6.75 % potassium (equivalent), approximately 2.1% nitrogen, 80% solids, 20% xylene, and is a solution of alkyl amido oximes in xylene. A more complete description of the compound is found in U.S. Pat. Nos. 3,088,798; 3,088,799; and 3,345,344.

The formulations were prepared by gradually adding the antimony oxide or mixture of antimony oxide and barium carbonate to the polyol with vigorous stirring to ensure formation of a uniform dispersion. The mixture of barium carbonate and antimony trioxide had been previously prepared by combining the two solids in the desired proportions to obtain a homogeneous mixture. The remaining components of the formulation, with the exception of the diisocyanate, were then added to the resultant dispersion, which was then mixed well to obtain a homogeneous composition. This composition was then combined with the diisocyanate and stirred vigorously for between 8 and 10 seconds, poured into an open top square container measuring 12 inches (30 cm.) along each side and allowed to foam. Sections measuring 10 × 10 × 1 inch (25 × 25 × 2.5 cm.) were sliced from the resultant block of foam.

The foam which did not contain barium carbonate exhibited numerous large splits and voids throughout the sample to the extent that the foam was not considered to be acceptable as an article of commerce. The sample containing barium carbonate had the desirable small uniform cell structure which characterizes a commercially useful product.

The flame retardancy of each foam sample was evaluated by placing it on a horizontally oriented square perforated metal plate measuring 10 inches along each edge. A square metal frame wherein the length of each outer edge was 10 inches (25 cm.) and the length of each inner edge was 8 inches (20 cm.) was placed on the foam sample such that the outer edges of the frame coincided with the four vertical sides of the sample, leaving an area of 64 square inches (412 sq. cm.) of foam exposed. The frame measured 0.13 inch (0.33 cm.) in thickness.

A table containing methanamine was placed in the center of the exposed area of the foam sample and ignited with a match. The sample was rated self-extinguishing if the resultant flame was extinguished before it had advanced to within 1 inch of the inner edge of the frame at any point. Three samples were tested using each of the foregoing formulations A and B. All samples were self-extinguishing.

What is claimed is:

1. In an improved composition for imparting flame retardancy to flexible and semiflexible polyurethane foams wherein said composition consists essentially of antimony trioxide and between 40 and 70 percent, based on the weight of said composition, of a finely divided halogen-containing polymer, the improvement which resides in the presence of barium carbonate in an amount between 2 and 50 percent, based on the combined weight of antimony trioxide and barium carbonate.

2. The improved composition of claim 1 wherein the halogen-containing polymer is a homopolymer or copolymer of vinyl chloride and exhibits an average particle size of between 0.0001 and 2 mm.

* * * * *